United States Patent
Manchireddy et al.

(10) Patent No.: US 11,315,571 B2
(45) Date of Patent: Apr. 26, 2022

(54) AUDIBLE AUTHENTICATION

(71) Applicant: Visa International Service Association, San Francisco, CA (US)

(72) Inventors: Archana Reddy Manchireddy, San Francisco, CA (US); Sumit Amar, Foster City, CA (US); Patrick Ryan Flanagan, Pleasanton, CA (US); Srinivas Bhagavathula, San Francisco, CA (US); Miranda Morgan, San Francisco, CA (US); Meryl Lazer, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 148 days.

(21) Appl. No.: 16/203,186

(22) Filed: Nov. 28, 2018

(65) Prior Publication Data
US 2020/0168229 A1    May 28, 2020

(51) Int. Cl.
*H04L 9/06* (2006.01)
*G10L 17/00* (2013.01)
(Continued)

(52) U.S. Cl.
CPC ........ *G10L 17/00* (2013.01); *G06Q 20/40145* (2013.01); *G10L 15/06* (2013.01); *H04L 9/0618* (2013.01)

(58) Field of Classification Search
None
See application file for complete search history.

(56) References Cited

U.S. PATENT DOCUMENTS

2012/0159574 A1* 6/2012 Cheong ............... H04L 63/1458
                                                    726/3
2016/0057139 A1* 2/2016 McDonough ......... H04L 67/141
                                                    726/6

(Continued)

FOREIGN PATENT DOCUMENTS

KR    20150096005    8/2015
WO    2017040436    3/2017

OTHER PUBLICATIONS

Soleymani et al., Social Authentication Protocol for Mobile Phones, 2009 International Conference on Computational Science and Engineering, pp. 436-441 (Year: 2009).*

(Continued)

*Primary Examiner* — Luu T Pham
*Assistant Examiner* — Edward X Long
(74) *Attorney, Agent, or Firm* — Kilpatrick Townsend & Stockton LLP

(57) ABSTRACT

A method is disclosed. A digital assistant device receives a biometric sample from a user and then converts the biometric sample to a biometric template. The digital assistant device can scan for user devices in communication range of the digital assistant device, thereby receiving user device identifiers. The digital assistant device can transmit, to a server computer, an authentication request comprising the biometric template and at least one user device identifier. The digital assistant device can then receive a cryptogram request message comprising the at least one user device identifier, from the server computer. The digital assistant device can transmit, to a user device corresponding to the at least one user device identifier, the cryptogram request message and can then receive a cryptogram. The digital assistant device can then transmit the cryptogram to the (Continued)

server computer. The server computer verifies the cryptogram before further processing of a transaction.

14 Claims, 6 Drawing Sheets

(51) Int. Cl.
*G10L 15/06* (2013.01)
*G06Q 20/40* (2012.01)

(56) References Cited

U.S. PATENT DOCUMENTS

| | | | |
|---|---|---|---|
| 2016/0063471 A1* | 3/2016 | Kobres | H04L 63/08 |
| | | | 705/18 |
| 2016/0092872 A1 | 3/2016 | Prakash et al. | |
| 2017/0171195 A1 | 6/2017 | Chang et al. | |
| 2017/0364920 A1 | 12/2017 | Anand | |
| 2018/0026973 A1 | 1/2018 | Le Saint et al. | |
| 2018/0300706 A1 | 10/2018 | Aggarwal et al. | |
| 2018/0338178 A1 | 11/2018 | Richman | |
| 2019/0236976 A1* | 8/2019 | Horban | G06N 3/008 |
| 2020/0042158 A1* | 2/2020 | Skarda | G06F 3/0481 |

OTHER PUBLICATIONS

Kiran et al., A Biometric zBased Payment System by Using Payee and Payer Module, 2017 2nd IEEE International Conference on Recent Trends in Electronics Information & Communication Technology, pp. 2252-2253 (Year: 2017).*

PCT/US2019/063391, "International Search Report and Written Opinion", dated Mar. 17, 2020, 11 pages.

Application No. EP19888761.4, Extended European Search Report, dated Dec. 8, 2021, 6 pages.

* cited by examiner

AUDIBLE AUTHENTICATION

BACKGROUND

Voice activated electronic devices are becoming more prevalent. An individual can speak a command to activate such a device. In response to a voice command, the device can perform various functions, such as turning an appliance on or off, searching a query on the Internet, performing a transaction, etc.

However, typical voice activated electronic devices only respond to commands from one individual and not others. The device can determine the command and perform the specified function. This is problematic when many individuals may attempt to use a shared device or the voice activated electronic device is a publicly used device. Shared digital assistant devices can also introduce additional security risks when performing functions, such as performing a transaction.

Embodiments of the invention address this problem and other problems individually and collectively.

SUMMARY

Embodiments of the invention are related to methods and systems for audible authentication.

One embodiment is related to a method comprising: receiving, by a digital assistant device, a biometric sample from a user; converting, by the digital assistant device, the biometric sample to a biometric template; scanning, by the digital assistant device, for user devices in communication range of the digital assistant device, thereby receiving user device identifiers; transmitting, by the digital assistant device to a server computer, an authentication request comprising the biometric template and at least one user device identifier; receiving, by the digital assistant device from the server computer, a cryptogram request message comprising the at least one user device identifier; transmitting, by the digital assistant device to a user device corresponding to the at least one user device identifier, the cryptogram request message; receiving, by the digital assistant device from the user device, a cryptogram; and transmitting, by the digital assistant device to the server computer, the cryptogram, wherein the server computer verifies the cryptogram before further processing of a transaction.

Another embodiment is related to a digital assistant device comprising: a processor; a memory device; and a computer-readable medium coupled to the processor, the computer-readable medium comprising code executable by the processor for implementing a method comprising: receiving a biometric sample from a user; converting the biometric sample to a biometric template; scanning for user devices in communication range of the digital assistant device, thereby receiving user device identifiers; transmitting, to a server computer, an authentication request comprising the biometric template and at least one user device identifier; receiving, from the server computer, a cryptogram request message comprising the at least one user device identifier; transmitting, to a user device corresponding to the at least one user device identifier, the cryptogram request message; receiving, from the user device, a cryptogram; and transmitting, to the server computer, the cryptogram, wherein the server computer verifies the cryptogram before further processing of a transaction.

One embodiment is related to a method comprising: receiving, by a server computer from a digital assistant device, an authentication request message comprising a biometric template and at least one user device identifier; comparing, by the server computer, the biometric template to a stored biometric concurrently with determining if the biometric template corresponds to an account associated with the at least one user device identifier; transmitting, by the server computer, a cryptogram request message to the digital assistant device; receiving, by the server computer, a cryptogram from the digital assistant device; determining, by the server computer, whether or not the cryptogram matches an issued cryptogram previously provisioned to a user device associated with the at least one user device identifier; and if the cryptogram matches the issued cryptogram, then further processing a transaction.

Another embodiment is related to a server computer comprising: a processor; a memory device; and a computer-readable medium coupled to the processor, the computer-readable medium comprising code executable by the processor for implementing a method comprising: receiving, from a digital assistant device, an authentication request message comprising a biometric template and at least one user device identifier; comparing the biometric template to a stored biometric concurrently with determining if the biometric template corresponds to an account associated with the at least one user device identifier; transmitting a cryptogram request message to the digital assistant device; receiving a cryptogram from the digital assistant device; determining whether or not the cryptogram matches an issued cryptogram previously provisioned to a user device associated with the at least one user device identifier; and if the cryptogram matches the issued cryptogram, then further processing a transaction.

Further details regarding embodiments of the invention can be found in the Detailed Description and the Figures.

DETAILED DESCRIPTION

Figure 1:
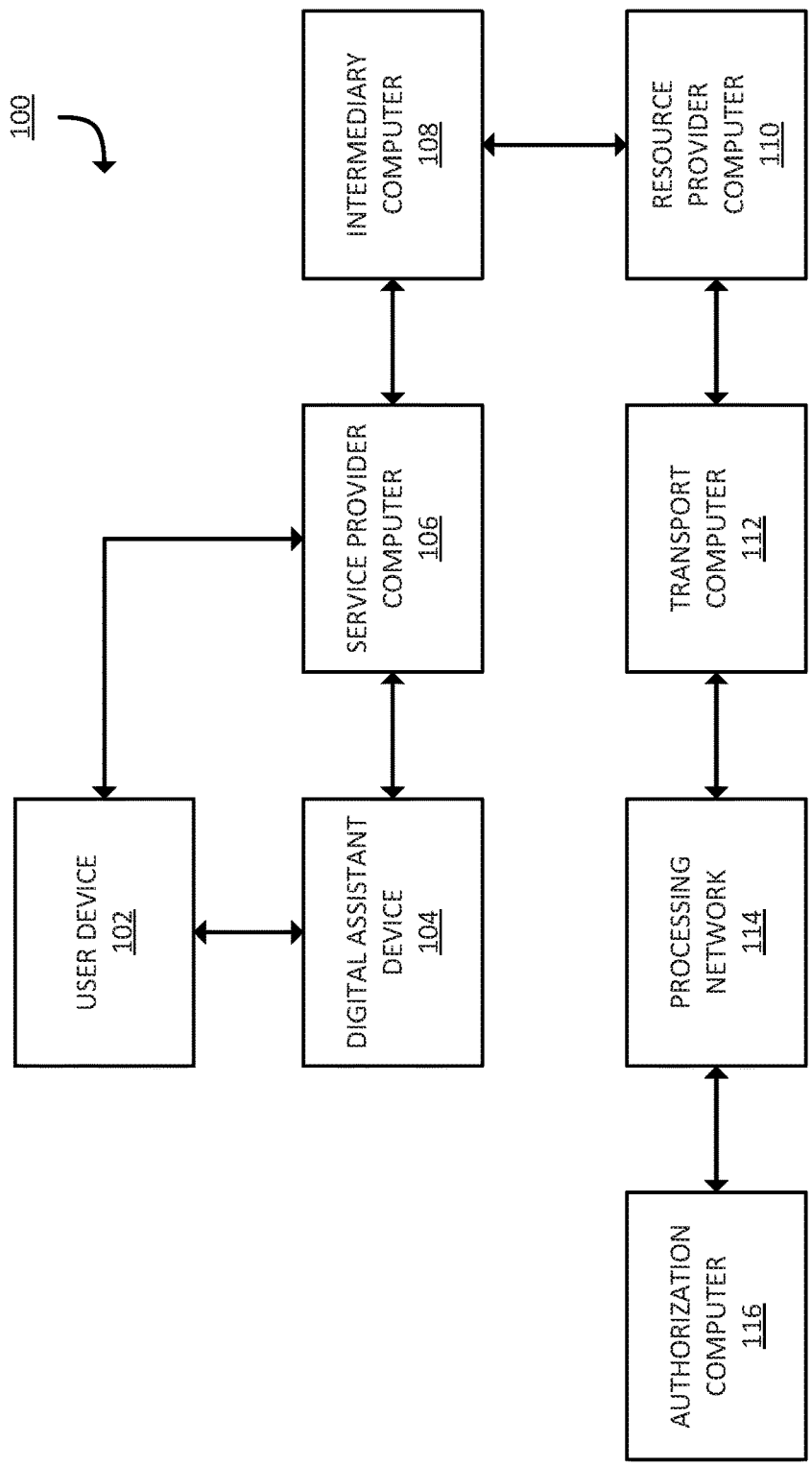
FIG. 1 shows a block diagram of a system illustrating an audible authentication system according to embodiments of the invention.

Prior to discussing embodiments of the invention, some terms can be described in further detail.

The term "digital assistant" or "digital assistant device" can include a device and/or software agent that can perform tasks and/or services. In some embodiments, a digital assistant can include an information processing system that can interpret natural language input in spoken and/or textual form to infer and/or determine user intent, and can perform actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs (application program interface), or the like; and generating output responses to the user in an audible (e.g., speech) and/or visual form.

A "user device" can include a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network.

A "user" may include an individual. In some embodiments, a user may be associated with one or more personal accounts and/or mobile devices. The user may also be referred to as a cardholder, account holder, or consumer in some embodiments.

An "interaction" may include a reciprocal action or influence. An interaction can include a communication, contact, or exchange between parties, devices, and/or entities. Example interactions include a transaction between two parties and a data exchange between two devices. In some embodiments, a transaction can be performed between a user and a resource provider. Interactions can also include agreements, contracts, and the like.

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, microphones, and iris scanners.

A "biometric sample" may include data obtained by a biometric reader. The data may be either an analog or digital representation of a user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample. A biometric template may be used during a biometric authentication process. For example, a biometric template may be a binary mathematical file representing the unique features of an individual's fingerprint, eye, hand or voice needed for performing accurate authentication of the individual. In some embodiments, a biometric template can be evaluated to determine a function to be performed.

"Speaker recognition" can include the identification of a user who is speaking based on characteristics of their voice. Speaker recognition can use acoustic features of speech that have been found to differ between individuals. These acoustic patterns reflect both anatomy (e.g., size and shape of the throat and mouth) and learned behavioral patterns (e.g., voice pitch, speaking style).

"Speech recognition" can include the translation of spoken words into text understandable by a computer system. Speech recognition combined with speaker recognition may simplify the task of translating speech in systems that are used to authenticate or verify the identity of a speaker as part of a security process.

"Voice recognition" may be used to describe both "speaker recognition" and "speech recognition."

A "match score," as described herein, can be a relationship between received input data and stored data. In the context of the present invention, the received input data can be a captured voice template. The stored data can be a previously captured and stored voice template. The match score may express the degree of confidence between the received input data and the stored data. The match score may be passed to other parts of a risk scoring mechanism, such that the match score contributes along with other risk parameters to an overall decision, for example, approving or declining a transaction. Setting an appropriate threshold to ensure an acceptable level of accuracy would be appreciated by one of ordinary skill in the art. This concept can be applied to other biometric data apart from voice samples (e.g., retinal scans, facial recognition data, etc.).

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

In embodiments of the invention, a cryptogram can be generated in any suitable manner. In some embodiments, the input to the cryptogram can include data elements including an account identifier such as primary account number, and a variable data element such as a counter, a time of day, or interaction value. Such data may be included using an encryption process such as DES (Data Encryption Standard), triple DES, or AES (Advanced Encryption Standard) using any suitable encryption keys. The encryption keys may also be UDKs or unique derived keys, and may be generated based upon device specific information such as an account number, which may be encrypted using a master derivation key (MDK). The cryptogram can be verified by another computer such a remote computer by either decrypting the cryptogram to and verifying the decrypted contents with other data (e.g., an account number stored on file), or by encrypting other inputs and then comparing the encrypted result to the cryptogram. Additional details regarding cryptogram formation and verification according to some embodiments can be found in U.S. Patent Publication No. 2013/0226802, which is incorporated by reference in its entirety.

A "digital wallet" can include an electronic device that allows an individual to conduct electronic commerce transactions. A digital wallet may store user profile information, account credentials, one or more digital wallet identifiers and/or the like and can be used in a variety of transactions, such as but not limited to eCommerce, social networks, money transfer/personal payments, mobile commerce, proximity payments, access transactions, and/or the like. A digital wallet may be designed to streamline the transaction process. A digital wallet may allow the user to load one or more account identifiers onto the digital wallet so as to conduct a transaction without having to enter an account identifier or present a physical identification.

A "digital wallet provider" may include an entity, such as an issuing entity or third party service provider, that issues a digital wallet to a user. The digital wallet provider may enable the user to conduct transactions. A digital wallet provider may provide standalone user-facing software applications that store account numbers, or representations of the account numbers (e.g., tokens), on behalf of an account holder (or other user) to facilitate transactions at more than one unrelated transacting entity, perform person-to-person transactions, or load value into the digital wallet. A digital wallet provider may enable a user to access its account via a personal computer, user device, access device, etc.

An "acquirer" may include a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "resource provider" may include an entity that can provide a resource such as goods, services, information, and/or access. Examples of resource providers includes merchants, data providers, transit agencies, governmental entities, venue and dwelling operators, etc.

A "merchant" may include an entity that engages in transactions. A merchant can sell goods and/or services or provide access to goods and/or services.

An "authorization request message" may include an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may include a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., point-of-sale (POS) equipment) that indicates approval of the transaction. The code may serve as proof of authorization.

An "authorizing entity" may include an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "credential" may include any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of payment credentials may include a PAN (primary account number or "account number"), user name, expiration date, and verification values such as CVV, dCVV, CVV2 (card verification value 2), dCVV2 (dynamic card verification value 2), and CVC3 (card verification code 3) values.

A "service provider" may include an entity that can provide a service and/or application. An example of a service provider is a digital wallet provider. A service provider may operate a service provider computer.

A "token" may include a substitute identifier for some information. For example, a payment token may include an identifier for a payment account that is a substitute for an account identifier, such as a PAN. For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "processor" may include a device that processes something. In some embodiments, a process can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may include any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

Embodiments of the invention can allow for a system capable of user registration, user authentication, and interaction authorization. During user registration, a user can open an application, such as a digital wallet application, on a user device. The user can input user details, into the user device, such as a name, a phone number, an address, payment credentials, etc. The user can also capture and save a biometric template using the user device. The biometric template can result from a voice biometric sample of a user's command, for example, "pay with XYZ wallet."

In some embodiments, the user device can transmit the user details and the biometric template to a service provider computer (e.g., a cloud wallet, VCOP (Visa checkout's open platform), or other suitable platform). In some embodiments, the user device can also transmit a device identifier to the service provider. The service provider computer can store the user details and the biometric template. In some embodiments, the service provider computer can store a payment token for the user's credentials, the voice phrase (i.e., the biometric template), a user device identifier and/or a generic attribute (GATT) profile, and/or a cryptogram that can be generated and pushed to the user device.

Embodiments of the invention also allow for a user to ask/command a digital assistant device to perform an interaction. For example, the user can speak a command such as "pay for product W with XYZ wallet." The digital assistant device can obtain a biometric sample from the user's command (i.e., biometric) using a biometric reader such as a microphone. The digital assistant device can then create a biometric template from the biometric sample. Further, the digital assistant device can scan for proximate devices. For example, the digital assistant device can scan for all Bluetooth low energy (BLE) enabled devices in proximity of the digital assistant device. The digital assistant device can then transmit the biometric template along with a list of proximate device identifiers to the service provider computer. The service provider computer can look up the matching device identifiers stored in a database of the service provider computer.

For a matched device identifier, the service provider computer can compare the received biometric template to stored biometric template(s) associated with the matched device identifier. In some embodiments, the service provider computer can also evaluate the received biometric template to determine user intent, as described in further detail herein. The service provider computer can then indicate to the digital assistant whether or not a device identifier and/or a biometric template match has been found. The digital assistant device can then notify the user of whether or not the match was found. For example, the digital assistant device can play a notification sound of other suitable audio output.

Embodiments of the invention can also allow for the service provider computer to request a cryptogram from the user device. For example, after finding a match for the device identifier and the biometric template, described herein, the service provider computer can request a cryptogram from the user device via the digital assistant device. The digital assistant device can request and receive the cryptogram from the matched user device. The digital assistant device can forward the cryptogram to the service provider computer. The service provider computer can then determine whether or not the received cryptogram matches the cryptogram previously pushed to the user device. In some embodiments, the service provider computer can transmit a payment token, corresponding to the user of the user device, to an authorization computer via an intermediary computer and/or a resource provider computer. Once the interaction is authorized (e.g., by the authorization computer), the digital assistant device can play another sound notifying that authorization has occurred.

FIG. 1 shows a block diagram of a system 100 comprising a number of components according to some embodiments of the invention. The system 100 comprises a user device 102, a digital assistant device 104, a service provider computer 106, an intermediary computer 108, a resource provider computer 110, a transport computer 112, a processing network 114, and an authorization computer 116.

The user device 102 may be in operative communication with the digital assistant device 104. For example, the user device 102 and the digital assistant device 104 can be in Bluetooth or BLE communication. The user device 102 can also be in operative communication with the service provider computer 106, for example, via Wi-Fi™.

The service provider computer 106 can be in operative communication with the user device 102, the digital assistant device 104, and the intermediary computer 108. The intermediary computer 108 can be in operative communication with the resource provider computer 110. In some embodiments, the intermediary computer 108 may be in operative communication with the transport computer 112. The transport computer 112 can be in operative communication with the resource provider computer 110 and the processing network 114, which may be in operative communication with the authorization computer 116.

Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The user device 102 can be operated by a user. In some embodiments, the user device 102 can include a digital wallet application. The user device 102 can be capable of receiving user input to allow the user to register with the digital wallet and/or register with the service provider computer 106. The user can input user details such as a name, a phone number, an address, payment credentials, and/or other suitable user details, into the user device 102. The user device 102 may also be capable of capturing a biometric sample and creating biometric templates from biometric samples. In some embodiments, the user device 102 may encrypt a biometric template prior to transmitting the biometric template to another device, such as a service provider computer 106. The user device 102 may also be associated with a device identifier. In some embodiments, the device identifier may be unique and may include alphanumeric characters. In other embodiments, the device identifier can be a GATT profile.

The digital assistant device 104 may be located in proximity to the user. In some embodiments, the digital assistant device 104 may be located at a resource provider location. The digital assistant device 104 can be capable of obtaining a biometric sample and creating a biometric template from the biometric sample. The digital assistant device 104 can be capable of analyzing a biometric sample and/or biometric template to determine a course of action, such as a function to be performed. In some embodiments, the digital assistant device 104 can include a microphone, which may be any device that converts sound to an electric signal. The microphone may be used to capture voice data from a user.

The service provider computer 106 may be a server computer operated by a service provider. The service provider may be an entity that provides an application to the user device 102 for use by the user. In some embodiments, the application provider can be a digital wallet provider that provides a digital wallet or payment application to the user device 102. The service provider computer 106 may maintain one or more digital wallets for each user, and each digital wallet may be associated with payment data for one or more payment accounts. Examples of digital wallets may include Visa Checkout™, Google™ Wallet, etc.

The intermediary computer 108 may be a server computer. The intermediary computer 108 may act as an intermediary between the service provider computer 106 and the resource provider computer 110. The intermediary computer 108 may route messages between the service provider computer 106 and the resource provider computer 110. In some embodiments, the intermediary computer 108 may store user details and may facilitate user login to the service provider computer 106.

The resource provider computer 110 may be configured to receive interaction data, such as transaction data, from another device, such as a service provider computer 106 and/or the intermediary computer 108. The resource provider computer 110 may enable a resource provider such as a merchant to engage in transactions, sell goods or services, or provide access to goods or services to the user. The resource provider computer 110 may accept multiple forms of payment and may use multiple tools to conduct different types of transactions.

The transport computer 112 may be located between (in an operational sense) the intermediary computer 108 and the processing network 114. The transport computer 112 may be operated by an entity such as an acquirer. An acquirer can maintain an account of any merchants (e.g., an airline, a department store, etc.) with which users may wish to interact.

The processing network 114 may route or switch messages between a number of transport computers including the transport computer 112, and a number of authorizing entity computers including the authorization computer 116. The processing network 114 may be a processing network computer in some embodiments. The processing network computer may be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing network computer may forward an authorization request received from a transport computer to the authorizing entity computer via a communication channel. The processing network computer may further forward an authorization response message received from the authorizing entity computer to the transport computer.

The authorization computer 116 may be configured to authorize any suitable request, including access to data, access to a location, or approval for a payment. In some embodiments, the authorization computer 116 may be operated by an account issuer. Typically, the issuer is an entity (e.g., a bank) that issues and maintains an account of a user. The account may be a credit, debit, prepaid, or any other type of account.

Figure 2:
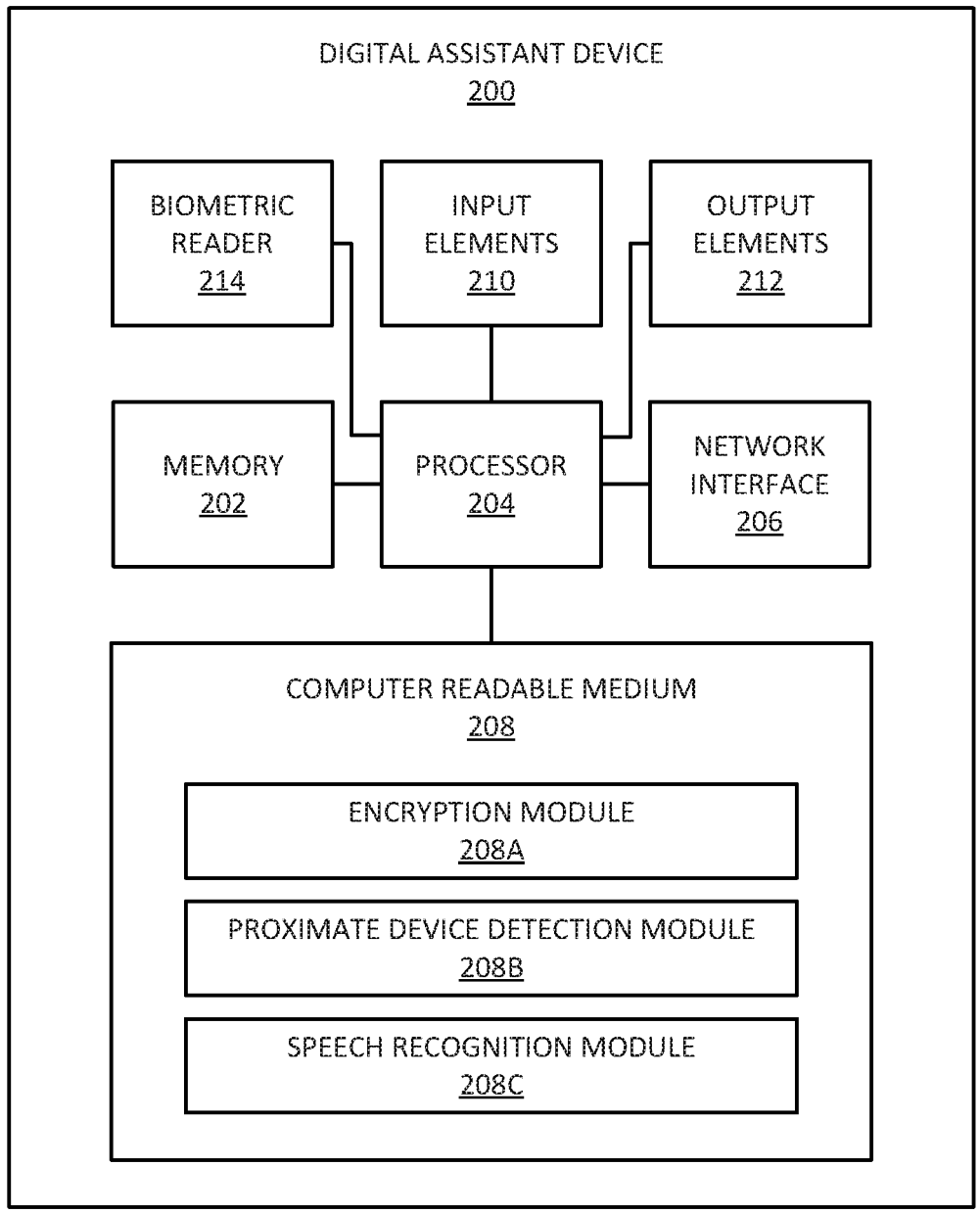
FIG. 2 shows a block diagram illustrating a digital assistant device according to embodiments of the invention.

FIG. 2 shows a block diagram of a digital assistant device 200 according to some embodiments of the invention. The exemplary digital assistant device 200 may comprise a processor 204. The processor 204 may be coupled to a memory 202, a network interface 206, a computer readable medium 208, input elements 210, output elements 212, and a biometric reader 214. The computer readable medium 208 can comprise an encryption module 208A, a proximate device detection module 208B, and a speech recognition module 208C.

The memory 202 may be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, to implement a method comprising: receiving, by a digital assistant device, a biometric sample from a user; converting, by the digital assistant device, the biometric sample to a biometric template; scanning, by the digital assistant device, for user devices in communication range of the digital assistant device, thereby receiving user device identifiers; transmitting, by the digital assistant device to a server computer, an authentication request comprising the biometric template and at least one user device identifier; receiving, by the digital assistant device from the server computer, a cryptogram request message comprising the at least one user device identifier; transmitting, by the digital assistant device to a user device corresponding to the at least one user device identifier, the cryptogram request message; receiving, by the digital assistant device from the user device, a cryptogram; and transmitting, by the digital assistant device to the server computer, the cryptogram, wherein the server computer verifies the cryptogram before further processing of a transaction.

The encryption module 208A may include any program, software, or other code suitable to perform operations related to encryption and/or decryption. The encryption module 208A can be capable of encrypting any suitable data. For example, the encryption module 208A can be capable of encrypting biometric templates. The digital assistant device 200 can transmit the encrypted biometric template(s) to a service provider computer. In some embodiments, a biometric template can be encrypted using a service provider computer public key. In other embodiments, a biometric template can be encrypted with a symmetric session key. It is understood that a biometric template can be encrypted in any suitable manner such that the service provider computer can be capable of decrypting the encrypted biometric template.

The encryption module 208A can use any suitable encryption algorithm(s). For example, the encryption module 208A may implement and perform encryption and/or decryption operations using encryption algorithms such as DES, AES, TDES/TDEA, or the like, and/or hash functions such as SHA, or the like, using cryptographic keys of any suitable length (e.g., 56-bit, 128-bit, 169-bit, 192-bit, 256-bit, etc.).

The proximate device detection module 208B can be capable of determining proximate devices. In some embodiments, the proximate device detection module 208B can determine proximate devices that are in Bluetooth or BLE communication range. For example, user devices and/or any other suitable BLE equipped device can broadcast a device identifier periodically or continuously; the proximate device detection module 208B can be capable of determining each device identifier received via BLE. The digital assistant device 200 can be capable of creating a list of device identifiers received from the proximate devices.

The speech recognition module 208C can include any program, software, or other code suitable to perform operations related to speech recognition. The speech recognition module 208C can be capable of translating spoken words into text understandable by a computer system. For example, the speech recognition module 208C can be capable of translating a biometric voice template and/or biometric into text. The speech recognition module 208C can analyze the text to determine whether or not the text includes instructions to perform a function. For example, the speech recognition module 208C can determine a function to perform using natural language processing. As known to one of skill in the art, the speech recognition module 208C can use any suitable natural language processing evaluations and tasks, such as, but not limited to, grammar induction, morphological segmentation, part-of-speech tagging, parsing, sentence breaking, word segmentation, etc.

In some embodiments, the speech recognition module 208C can be capable of actively eliciting input from a user, interpreting user intent, disambiguating among competing interpretations, requesting and receiving clarifying information as needed, and/or performing (or initiating) actions based on the discerned intent. The speech recognition module 208C can use any suitable natural language processing techniques. For further details regarding natural language processing see [Nadkarni, Prakash M et al. "Natural language processing: an introduction" Journal of the American Medical Informatics Association: JAMIA vol. 18, 5 (2011): 544-51], which is herein incorporated for all purposes in its entirety. Additionally, for further details regarding recent trends in deep learning based natural language processing see [Tom Young et al. "Recent Trends in Deep Learning Based Natural Language Processing" arXiv, arXiv: 1708.02709 (2017)], which is herein incorporated for all purposes in its entirety.

The network interface 206 may include an interface that can allow the digital assistant device 200 to communicate with external computers. The network interface 206 may enable the digital assistant device 200 to communicate data to and from another device (e.g., a service provider computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The one or more input elements 210 may include any suitable device(s) capable of inputting data into the digital assistant device 200. Examples of input devices include buttons, touchscreens, touch pads, etc.

The one or more output elements 212 may comprise any suitable device(s) that may output data. Examples of output elements 212 may include display screens, speakers, and data transmission devices.

The biometric reader 214 may include a device for capturing data from a user's biometric sample. Examples of biometric readers 214 may include fingerprint readers, front-facing cameras, microphones, and iris scanners. The biometric reader 214, such as a microphone, can be configured to capture one or more audio segments from a user. In some embodiments, the biometric reader 214 may capture voice data by the user to determine user intent.

Figure 3:
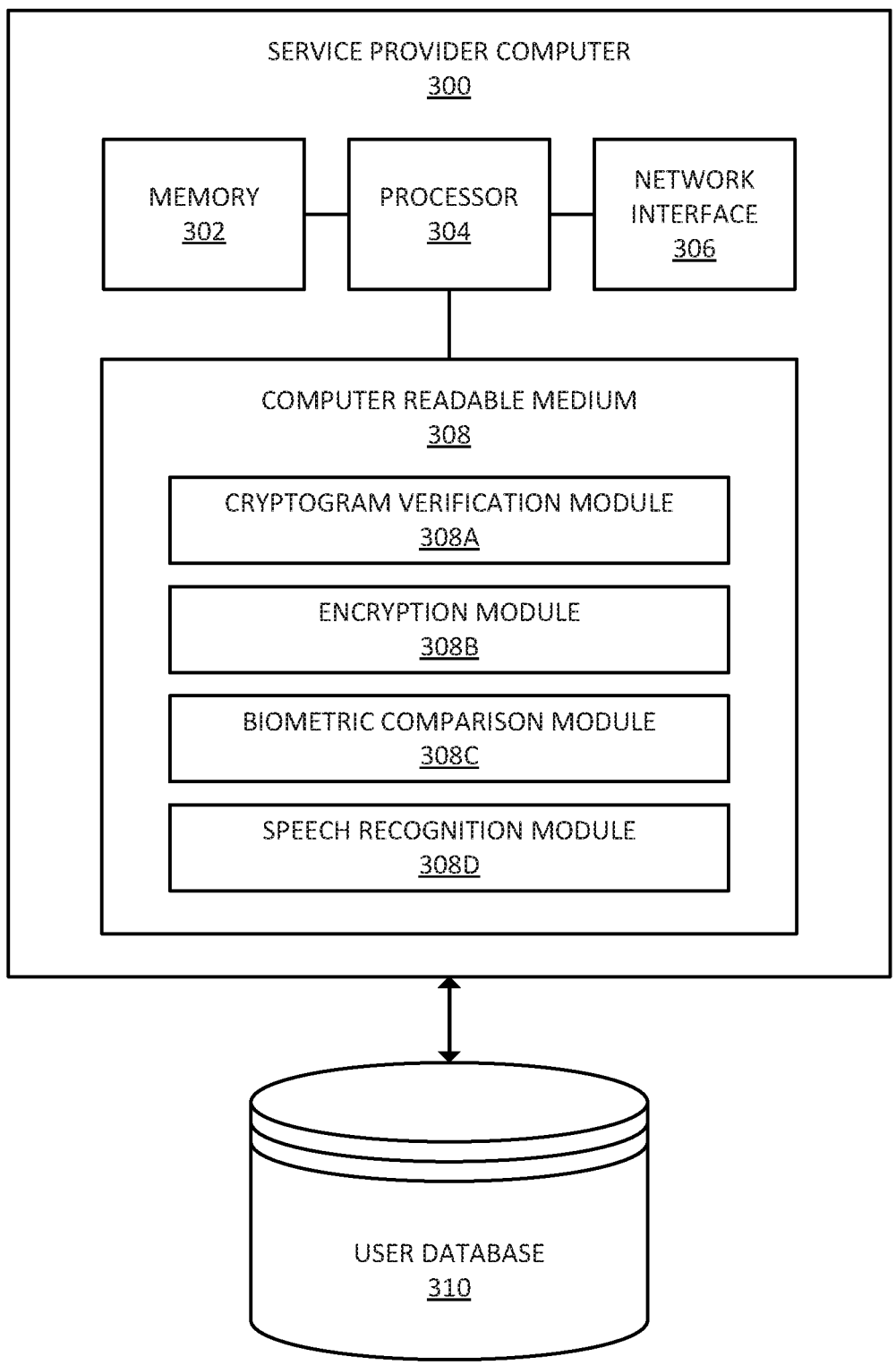
FIG. 3 shows a block diagram illustrating a service provider computer according to embodiments of the invention.

FIG. 3 shows a block diagram of a service provider computer 300 according to some embodiments of the invention. The exemplary service provider computer 300 may comprise a processor 304. The processor 304 may be coupled to a memory 302, a network interface 306, and a computer readable medium 308 comprising a cryptogram verification module 308A, an encryption module 308B, a biometric comparison module 308C, and a speech recognition module 308D. The service provider computer 300 may be operatively coupled to a user database 310.

The memory 302 can be similar to the memory 202 described in FIG. 2, and will not be repeated here. The network interface 306 can be similar to the network interface 206 described in FIG. 2, and will not be repeated here.

The computer readable medium 308 may comprise code, executable by the processor 304, to implement a method comprising: receiving, by a server computer from a digital assistant device, an authentication request message comprising a biometric template and at least one user device identifier; comparing, by the server computer, the biometric template to a stored biometric concurrently with determining if the biometric template corresponds to an account associated with the at least one user device identifier; transmitting, by the server computer, a cryptogram request message to the digital assistant device; receiving, by the server computer, a cryptogram from the digital assistant device; determining, by the server computer, whether or not the cryptogram matches an issued cryptogram previously provisioned to a user device associated with the at least one user device identifier; and if the cryptogram matches the issued cryptogram, then further processing a transaction.

The cryptogram verification module 308A may include any program, software, or other code suitable to perform operations related to verifying a cryptogram. For example, the cryptogram verification module 308A can compare a cryptogram received from a user device (i.e., received cryptogram) to a cryptogram previously provisioned to the user device (i.e., stored cryptogram). The cryptogram verification module 308A can determine whether or not the received cryptogram matches the stored cryptogram.

The encryption module 308B may include any program, software, or other code suitable to perform operations related to encryption and/or decryption. For example, the encryption module 308B can be capable of decrypting biometric templates. The digital assistant device 200 can transmit the encrypted biometric template(s) to the service provider computer 300. The encryption module 308B can be capable of decrypting the encrypted biometric templates. In some embodiments, an encrypted biometric template can be decrypted using a service provider computer private key. In other embodiments, an encrypted biometric template can be decrypted with a symmetric session key. It is understood that an encrypted biometric template can be decrypted in any suitable manner such that the service provider computer 300 can be capable of decrypting the encrypted biometric template that is encrypted by the service provider computer 300. In some embodiments, the encryption module 308B can have similar capabilities to the encryption module 208A.

The biometric comparison module 308C may include any program, software, or other code suitable to perform operations related to biometric comparisons. The biometric comparison module 308C is configured to determine whether a received biometric template from a user matches a previously registered biometric template from the user. For example, if a user wishes to initiate a payment transaction, the biometric comparison module 308C can compare the user's biometric template, for example, a biometric voice template, to a stored biometric voice template to authenticate the user. In some embodiments, the biometric comparison module 308C can perform speaker recognition when the received biometric template is a biometric voice template. In other embodiments, the biometric comparison module 308C can determine a match value which may indicate how closely the two compared biometric templates match.

The speech recognition module 308D can include any program, software, or other code suitable to perform operations related to speech recognition. The speech recognition module 308D can be capable of translating spoken words into text understandable by a computer system. The speech recognition module 308D may be similar to the speech recognition module 208C.

The user database 310 may securely store data, such as user details, encrypted biometric templates, cryptograms, etc. as part of a user profile. The user database 310 may be a conventional, fault tolerant, relational, scalable, secure database such as those commercially available from Oracle™ or Sybase™. The service provider computer 300 can be configured to access the user database 310. For example, the service provider computer 300 can query the user database 310 for user profiles associated with devices identifiers in a list of device identifiers. The service provider computer 300 can retrieve the respective user profiles and information therein.

Figure 4:
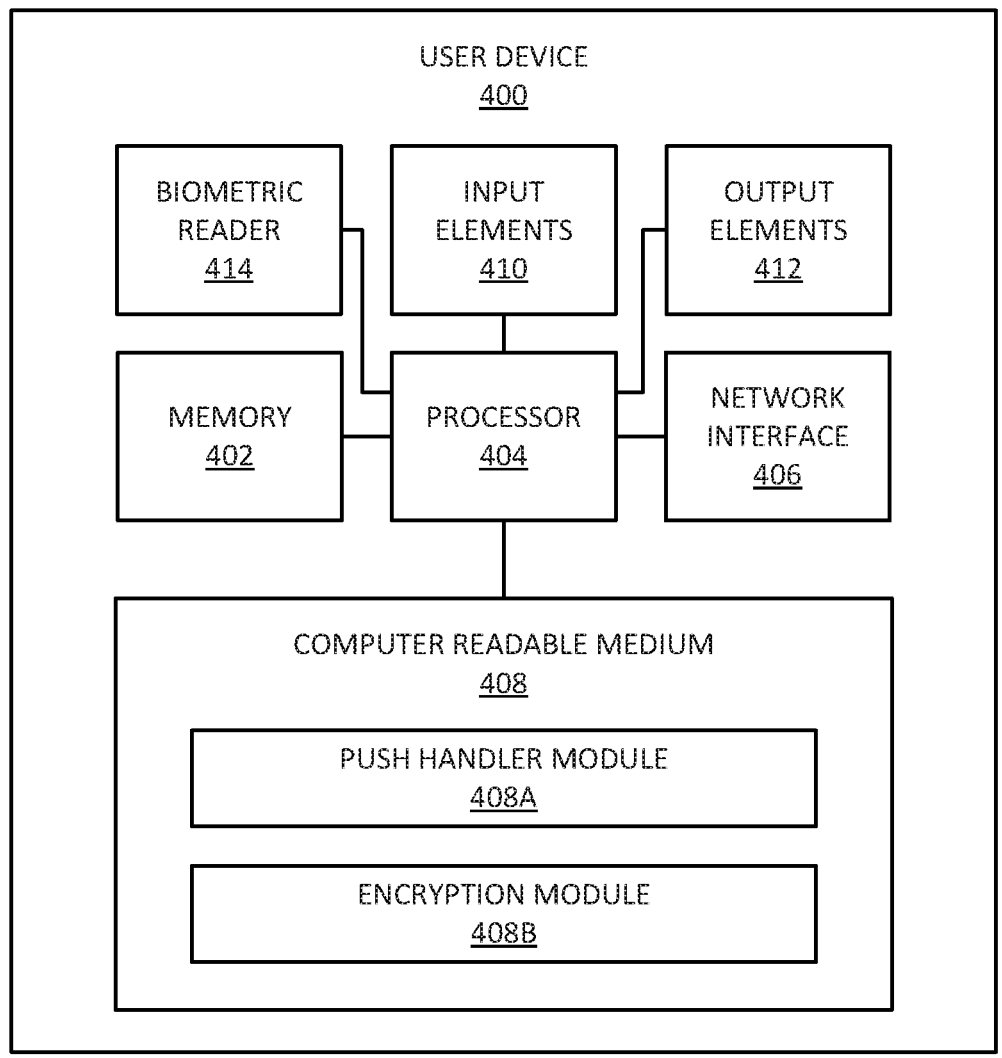
FIG. 4 shows a block diagram illustrating a user device according to embodiments of the invention.

FIG. 4 shows a block diagram of user device 400 according to some embodiments of the invention. The exemplary user device 400 may comprise a processor 404. The processor 404 may be coupled to a memory 402, a network interface 406, a computer readable medium 408, input elements 410, output elements 412, and a biometric reader 414. The computer readable medium 408 can comprise a push handler module 408A and an encryption module 408B.

The memory 402 can be similar to the memory 302 and the memory 202 as described in FIG. 3 and FIG. 2, respectively, and will not be repeated here. The memory 402 can be a secure memory such as an HSM (hardware security module), secure element, or other suitable secure memory. The secure memory can store a cryptogram securely.

The network interface 406 can be similar to the network interface 306 and the network interface 206 as described in FIG. 3 and FIG. 2, respectively, and will not be repeated here. The one or more input elements 410 can be similar to the one or more inputs elements 210, as described in FIG. 2, and will not be repeated here. The one or more output elements 412 can be similar to the one or more output elements 212, as described in FIG. 2, and will not be repeated here. The biometric reader 414 can be similar to the biometric reader 214, as described in FIG. 2, and will not be repeated here.

The computer readable medium 408 may comprise code, executable by the processor 404. The computer readable medium 408 may contain any number of applications, modules, and code.

The push handler module 408A may include any program, software, or other code suitable to perform operations related to receiving data and/or information pushed from a device, computer, server, etc. For example, the push handler module 408A can be capable of receiving data, such as a cryptogram, from a server computer, such as a service provider computer. The push handler module 408A can receive a cryptogram at any suitable time while in operative communication with the service provider computer (e.g., via the Internet). In some embodiments, the received cryptogram can replace a previously received cryptogram, in this way, the user device 400 may store the latest cryptogram.

The encryption module 408B may include any program, software, or other code suitable to perform operations related to encryption and/or decryption. The encryption module 408B may be capable of encrypting and/or decrypting any suitable data.

In some embodiments, a user can manage card credentials in the cloud using the user device 400. The user may also access the cloud wallet by way of interacting with a digital assistant device with their voice, given that their user device is in the proximity defined. In some embodiments, the user can also manage their biometric templates on the service provider computer using the user device 400.

Interactions, such as transactions, can then be completed for goods and services serviced by the digital assistant device with a limited use payment credential to prevent replay issues. In some embodiments, one-time cryptogram can be issued for this type of authentication.

When the user interacts with a digital assistant device, the digital assistant device can scan for available user devices that are in proximity of its BLE component. In some embodiments, the digital assistant device may scan for user devices that include a digital wallet application. In some embodiments, the discovery of digital wallet "usernames" can be paired with the user's password, which could be exclusively or a combination of the following: a user defined descriptor of the wallet "Masha's wallet" or the raw data produced by the human voice interacting with a microphone (resulting in e.g., a .wav file, .mp3, etc.) and/or a device GATT profile registered on the service provider computer. In this way, the user's biometric template and/or user device identifier can be used as a password to authenticate the user when accessing the digital wallet.

This data can then be used to verify the appropriate digital wallet, and access the digital wallet synchronously after BLE has scanned for all available digital wallets. In addition to the user's information, once the user registers their payment credentials on the service provider computer, an authentication service can dynamically generate a cryptogram and push it to the user device. In some embodiments, during payment, a digital assistant device can request this information from the user device and then send it to the service provider computer for verification. After the service provider computer verifies the cryptogram, interaction authorization may be performed.

Figure 5A:
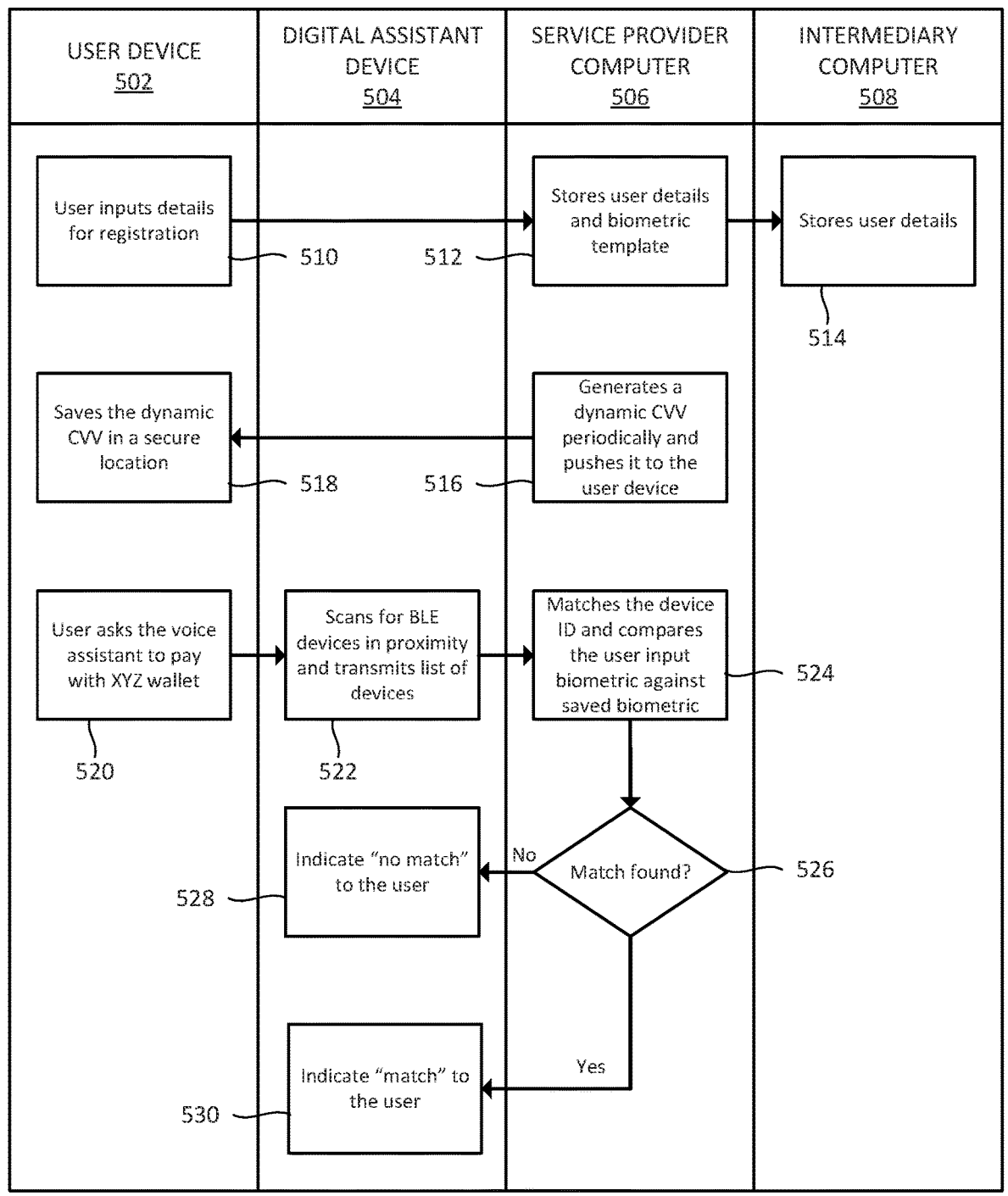
FIG. 5A shows a swim lane diagram illustrating authentication according to embodiments of the invention.
Figure 5B:
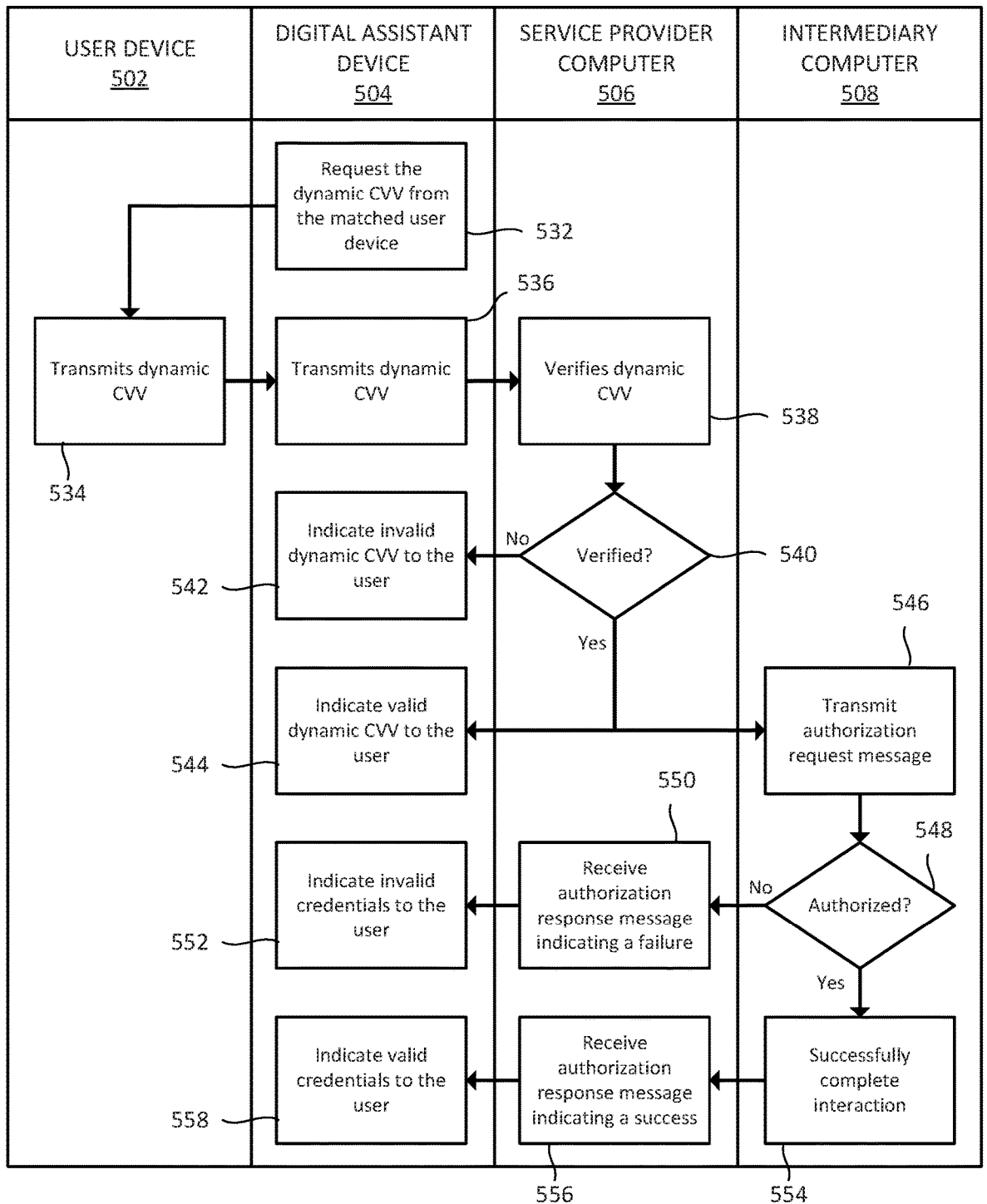
FIG. 5B shows a swim lane diagram illustrating authentication according to embodiments of the invention.

FIGS. 5A-5B shows a swim lane diagram illustrating an authentication method according to embodiments of the invention. The method illustrated in FIGS. 5A-5B will be described in the context of a user asking a digital assistant device to purchase a product at a resource provider location. It is understood, however, that the invention can be applied to other circumstances (e.g., a user asking a digital assistant device to perform an interaction such as a data transfer, a user operating a digital assistant device in various locations such as at the user's house, etc.). Although the steps are illustrated in a specific order, it is understood that embodiments of the invention may include methods that have the steps in different orders. In addition, steps may be omitted or added and may still be within embodiments of the invention.

At step 510, a user device 502 can receive user input for registration including user details and a biometric template. The user details, also referred to as registration details, can include a name, a phone number, an address, credentials, and/or other suitable user details. The user device 502 can also receive a biometric sample from the user via a biometric reader. The biometric reader can capture a biometric and can output the biometric template.

The user device 502 may create the biometric template using any suitable biometric reader or input scanner. For example, the user may place their finger on a fingerprint scanner located on the user device 502. The biometric reader can obtain a biometric sample from the user (e.g., by scanning the user's fingerprint). Upon obtaining the biometric sample from the user, the user device 502 may create a biometric template associated with the user. The biometric template may be a digital reference of distinct characteristics that have been extracted from the biometric sample. For example, in the case where the biometric sample is a fingerprint, the biometric template may contain the minutiae (or major features) of the fingerprint.

In some embodiments, generating the biometric template can include identifying distinctive features of the measured biometric sample and then representing the distinctive features in digital form. For example, a data file may be created from the capture of electromagnetic signals generated by a biometric reader during sample reading, in which the signals may be binned into discrete bits according to a pre-defined resolution (i.e. as expressed by the number of pixels in an image or by the sample rate of an audio file). Software stored on the user device 502 may then be used to identify features of the data file that can be used to accurately authenticate the user. For example, the user may be asked to present his or her biometric multiple times, and a mathematical model may be used to determine features that consistently appear. The features may be represented as a binary digital file, which may form the biometric template.

In some embodiments, generating the biometric template can be a two-step process. First, a first data file may be created based on the measurement. For example, this can be a complete image of a fingerprint or face, or a complete voice sample. Second, the first data file can be used to identify distinctive features of the biometric sample, and information about the distinctive features can be stored in a second data file. Embodiments of the invention allow either the first data file (e.g., a data file that represents the entire biometric sample) or the second data file (e.g., a data file that represents distinctive features of the biometric sample) to be used as the biometric template.

In some embodiments, the user device 502 can receive one or more biometric samples corresponding to various phrases the user can state to later perform an interaction. For example, the user may have two payment accounts; one corresponding to a credit card and a second corresponding to a debit card. The user can use the user device 502 to record voice samples for each payment account that the user wants to enroll. The user can speak a first voice sample of "pay with wallet XYZ, card ABC" and a second voice sample of "pay with wallet XYZ, card DEF." In this way, the service provider computer 506 can later (e.g., at step 534) determine which account of one or more accounts the user wants to use. Each biometric template can be unique to each service provider computer and/or each payment credential, i.e., debit card, prepaid card, credit card, etc. This property can be referred to as user defined text dependent speaker recognition. When the biometric templates are voice templates, the voice template can include not only information regarding the identity of the user for authentication, but also information regarding actions that the user wants to perform, such as "purchase item HHH".

After generating the biometric template, the user device 502 can encrypt the biometric template in any suitable manner described herein. After encrypting the biometric template, the user device 502 can transmit the user details and the encrypted biometric template to the service provider computer 506. In some embodiments, the user device 502 can also transmit a device identifier to the service provider computer 506. In some embodiments, the device identifier can be a GATT profile.

At step 512, after receiving the user details and the encrypted biometric template from the user device 502, the service provider computer 506 can store the user details and the encrypted biometric template. In some embodiments, the service provider computer 506 can also store the credentials and/or a payment token. The service provider computer 506 can transmit the user details to the intermediary computer 508.

At step 514, after receiving the user details from the service provider computer 506, the intermediary computer 508 can store the user details. The intermediary computer 508 can facilitate the user logging in to a service provider application installed on the user device 502. For example, the intermediary computer 508 can store a username and an address of the user.

At step 516, at any suitable point after the service provider computer 506 stores the user details (i.e., the user has been registered), the service provider computer 506 can periodically generate a cryptogram, such as a dCVV. The service provider computer 506 can push the cryptogram to the user device 502. For example, the service provider computer 506 can generate and push a cryptogram to the user device 502 once per day. The service provider computer 506 can generate and push the cryptogram at any suitable rate, for example, every hour, once per 12 hours, once per week, after each interaction, etc. The service provider computer 506 can transmit the cryptogram to the user device 502 over any suitable communication channel as described herein.

At step 518, after receiving the cryptogram from the service provider computer 506, the user device 502 can store the cryptogram in a secure memory. In some embodiments, the user device 502 may replace a previously received cryptogram with the latest (i.e., most recently received) cryptogram.

At step 520, at any suitable point, the user can ask the digital assistant device 504 to perform an interaction (i.e., the user can speak a command to the digital assistant device 504). For example, the user can be at a resource provider location and can ask the digital assistant device 504 to "pay with XYZ wallet." In some embodiments, the user can specify a particular service provider computer, one or more products and/or services, an amount, a user name, etc. in the user's command. For example, the user may state "purchase two blue shirts with XYZ wallet" or other suitable command.

In some embodiments, the user may be provided with a product number and/or code (i.e., product data) that the user can state in their command to the digital assistant device 504. For example, a user may attempt to purchase a shirt at a resource provider location. The shirt can have a tag with a product number, for example, "4000." The user can then state "purchase item 4000 with XYZ wallet." Later in the process, the product number and/or code can be determined by the service provider computer 506 by evaluating the user's biometric template resulting from the user's voice command. In some embodiments, a resource provider computer can receive an authorization request message along with the product number and/or code. The resource provider computer can add and/or edit the authorization request message to include an accurate transaction amount associated with the product number and/or code.

The digital assistant device 504 can receive and capture the user's command. For example, the digital assistant device 504 can capture the user's command using microphone. The microphone can create a biometric sample. In some embodiments, the user may speak an activation command prior to speaking the command. The activation command may be any suitable phrase, for example, "hello, digital assistant," "ready to check out," etc. Upon detecting the activation command, the digital assistant device 504 can begin obtaining the user's biometric sample with the biometric reader (e.g., recording the user's command). After receiving the biometric sample, the digital assistant device 504 can convert the received biometric sample to a biometric template, in any suitable method described herein.

After creating the biometric template, the digital assistant device 504 can evaluate the biometric template. For example, the digital assistant device 504 can perform speech recognition, which can include the translation of spoken words into text understandable by the digital assistant device 504. For example, the digital assistant device 504 can convert the received biometric template (i.e., user's voice command) into text. The digital assistant device 504 can recognize a command corresponding to the converted text. The digital assistant device 504 can perform the command corresponding to the converted text, for example, the command may be to perform an interaction such as a transaction. The biometric sample can be a command spoken by the user and the biometric template can be a biometric voice template.

In some embodiments, the digital assistant device 504 can include code, trained with speech recognition training data, capable of determining user intent. Any suitable speech recognition model, method, and/or algorithm can be used. For example, hidden Markov models (HMM), dynamic time warping (DTW)-based speech recognition, neural networks, etc. may be used to evaluate the text.

In some embodiments, the digital assistant device 504 can respond to the user's command by audibly playing a response to the user. For example, a response may be "I will place an order for product W using XYZ wallet, do you want to confirm?" However, it is understood, that the response may be in any suitable form as known by one of ordinary skill in the art.

In other embodiments, the digital assistant device 504 can audibly, or otherwise, prompt the user to provide additional details for the user's command. For example, the digital assistant device 504 may prompt the user to repeat a portion of the command, or supplement the command with an amount, wallet, product, or other information if the user did not provide the information in the first user command.

In yet other embodiments, the digital assistant device 504 can clean the biometric template. For example, the digital assistant device 504 can also capture ambient noise and may be capable of subtracting the ambient noise from the biometric template.

In some embodiments, the digital assistant device 504 can determine which service provider computer 506 the user stated in the command. For example, in some embodiments, the digital assistant device 504 can compare the text obtained from the biometric template and/or biometric sample to a list of possible service provider computers. In some embodiments, the user's command may be "purchase W using ABC card of XYZ wallet." The digital assistant device 504, after parsing the command, can determine the service provider computer 506 based on "XYZ wallet."

At step 522, after creating the biometric template and determining that the user wants to perform an interaction, the digital assistant device 504 can scan for proximate devices. For example, the digital assistant device 504 can determine devices in a certain range of the digital assistant device 504. In some embodiments, the digital assistant device 504 can scan for BLE devices in proximity. The digital assistant device 504 can determine a device identifier for each proximate device detected. For example, the user may have their user device 502 in proximity to the digital assistant device 504. However, other individuals may have devices in proximity to the digital assistant device 504. The digital assistant device 504 can receive a device identifier from each device in proximity and may not have additional information to determine which device identifier corresponds to the user device 502.

The digital assistant device 504 can generate a list of device identifiers of the proximate devices. The digital assistant device 504 can then transmit the list of device identifiers to the service provider computer 506. The list of device identifiers can be any suitable list. For example, the list of device identifiers may be a data item comprising data fields that can be filled, by the digital assistant device 504, with device identifiers received from the proximate devices. The digital assistant device 504 can also transmit the biometric template to the service provider computer 506.

In some embodiments, the digital assistant device 504 can encrypt the biometric template prior to transmitting the biometric template to the service provider computer 506. For example, the digital assistant device 504 can encrypt the biometric template with a service provider computer public key, where the service provider computer 506 can be capable of decrypting the encrypted biometric template, for example, using a service provider computer private key.

At step 524, after receiving the list of device identifiers and the biometric template from the digital assistant device 504, the service provider computer 506 can perform voice recognition, including both speaker recognition as well as speech recognition. During speaker recognition, the service provider computer 506 can compare the biometric template received from the digital assistant device 504 (i.e., received biometric template) to stored biometric template(s).

The service provider computer 506 can query a database (e.g., a user database) for device identifiers that match the device identifiers in the list of device identifiers. The service provider computer 506 can retrieve the user profiles corresponding to the device identifiers in the list of device identifiers. For example, if the lists of device identifiers includes 3 device identifiers, then the service provider computer 506 can query the database for the 3 device identifiers and the corresponding user profiles.

The service provider computer 506 can compare the received biometric template to the stored biometric templates of the retrieved user profiles. For example, the service provider computer 506 can compare the received biometric template to each of the 3 user profiles that correspond to the 3 device identifiers of the list of identifiers. In this way, the service provider computer 506 may not need to compare the received biometric template to each and every stored biometric template.

As an example, the service provider computer 506 can compare the pitch of the receive biometric template to the pitch of the stored biometric template. If the pitch of both templates are similar, within an error margin, the service provider computer 506 can determine that the templates match. In some embodiments, the service provider computer 506 can compare any suitable number of other characteristics of the templates for example, word matching, phrase matching, pattern analysis, and/or other spectrographic analyses.

In some embodiments, the service provider computer 506 can first decrypt the stored encrypted biometric templates prior to comparing the stored biometric templates to the received biometric template.

If the service provider computer 506 determines that at least one device identifier of the list of device identifiers and the received biometric template correspond to the same user profile, the service provider computer 506 can determine which user has initiated the command to the digital assistant device 504, thus authenticating the user.

While matching the device identifier and the received biometric template, the service provider computer 506 can perform speech recognition on the received biometric template. The service provider computer 506 can determine a function to perform based on the received biometric template. For example, if the received biometric template is a voice sample stating "purchase X with wallet XYZ," the service provider computer 506 can determine that the user wants to purchase the item X with the wallet XYZ.

The service provider computer 506 can also determine transaction information from the received biometric template. For example, the service provider computer 506 can evaluate the received biometric template to determine a product and/or service that the user wants to purchase. In some embodiments, the user can state the products and/or services they want to purchase in their command to the digital assistant device 504. For example, in some embodiments, the service provider computer 506 can utilize simple pattern matching, pattern and feature analysis, language modeling and statistical analysis, and/or artificial neural networks to determine which products the user wants to purchase.

At step 526, after determining whether or not the received biometric template matches a stored biometric template, the service provider computer 506 can transmit an authentication response to the digital assistant device 504. The authentication response can indicate whether or not there was a match. If the service provider computer 506 determined that the received biometric template does not match a stored biometric template, the process can proceed to step 528. If the service provider computer 506 determined that the received biometric template matches a stored biometric template, the process can proceed to step 530.

At step 528, after receiving the authentication response from the service provider computer 506, if the authentication response indicates "no match," the digital assistant device 504 can indicate to the user that the biometric template does not match a stored biometric template. For example, the digital assistant device 504 can play a noise and/or state any suitable "no match" message, such as, for example, "your voice was not recognized."

At step 530, after receiving the authentication response from the service provider computer 506, if the authentication response indicates "match," the digital assistant device 504 can indicate to the user that the biometric template does match a stored biometric template. For example, the digital assistant device 504 can play a noise and/or state any suitable "match" message such as, for example, "your request is being processed" or "your voice has been authenticated."

Referring to FIG. 5B, at step 532, if the authentication response indicates "match," the authentication response may also include a cryptogram request. In some embodiments, the service provider computer 506 can include the device identifier of the user device 502 in the cryptogram request, which can allow the digital assistant device 504 to determine which user device to transmit the cryptogram request to. The digital assistant device 504 can forward the cryptogram request to the appropriate user device 502.

At step 534, after receiving the cryptogram request from the digital assistant device 504, the user device 502 can transmit the cryptogram to the digital assistant device 504. At step 536, after receiving the cryptogram from the user device 502, the digital assistant device 504 can forward the cryptogram to the service provider computer 506.

At step 538, after receiving the cryptogram, the service provider computer 506 can verify the cryptogram. For example, the service provider computer 506 can compare the cryptogram received from the user device 502 to the cryptogram previously transmitted to the user device 502 (e.g., at step 516).

At step 540, the service provider computer 506 can determine whether or not the cryptogram is verified. If the cryptogram is not verified, then the process can proceed to step 542. If the cryptogram is verified, then the process can proceed to step 544 and/or step 546 which, in some embodiments, may be performed concurrently.

At step 542, if the cryptogram is not verified, the service provider computer 506 can transmit a verification notification to the digital assistant device 504. The verification notification can indicate that the cryptogram is not verified. The digital assistant device 504 can indicate the user that the cryptogram is invalid. For example, the digital assistant device 504 can play an audio file to the user. The audio file can be a noise or a statement, such as, "interaction failed," "invalid cryptogram," etc.

At step 544, if the cryptogram is verified, the service provider computer 506 can transmit a verification notification to the digital assistant device 504. The verification notification can indicate that the cryptogram is verified. The digital assistant device 504 can indicate that the cryptogram is valid to the user. For example, the digital assistant device 504 can play an audio file to the user. The audio file can be a noise or a statement, such as, "valid user device," "valid cryptogram," etc.

After the service provider computer 506 determines that the cryptogram is valid, the service provider computer 506 can transmit credentials, associated with the user, to the intermediary computer 508. The service provider computer 506 can indicate for the intermediary computer 508 to generate an authorization request message for the interaction. The service provider computer 506 can also transmit interaction information, such as transaction information, determined from the biometric template to the intermediary computer 508.

In other embodiments, the service provider computer 506 can be configured to authorize the interaction. For example, upon verifying the cryptogram, the service provider computer 506 can authorize the transaction.

At step 546, after receiving the credentials and interaction information from the service provider computer 506, the intermediary computer 508 can generate an authorization request message. The authorization request message can include credentials. In some embodiments, the authorization request message can also include transaction information, such as any information associated with the current transaction, such as the transaction value, merchant identifier, merchant location, acquirer bank identification number (BIN), card acceptor ID, information identifying items being purchased, etc., as well as any other information that may be utilized in determining whether to authorize the transaction. The intermediary computer 508 can transmit the authorization request message to a resource provider computer (e.g., the resource provider computer 110 in FIG. 1).

In some embodiments, the service provider computer 506 can generate and then transmit the authorization request message to the resource provider computer. The resource provider computer can be operated by a resource provider, which may be the same resource provider operating the digital assistant device 504. Upon receiving the authorization request message, the resource provider computer may transmit the authorization request message to a transport computer, as described in further detail herein. In some embodiments, the resource provider computer can receive an authorization request message from the service provider computer 506 including credentials. The resource provider computer can then include transaction information into the authorization request message prior to transmitting the authorization request message to the transport computer.

At step 548, the intermediary computer 508 can receive an authorization response message. For example, the intermediary computer 508 can receive the authorization response message from an authorization computer, via a resource provider computer, a processing network, and/or a transport computer. The intermediary computer 508 can determine whether or not the interaction was authorized based on the authorization response message. If the intermediary computer 508 determines that the interaction was authorized, then the process can proceed to step 554. If the intermediary computer 508 determines that the interaction was not authorized, then the process can proceed to step 550.

At step 550, the intermediary computer 508 can forward the authorization response message to the service provider computer 506. In some embodiments, after receiving the authorization response message, the service provider computer 506 can forward the authorization response message to the digital assistant device 504. In other embodiments, the service provider computer 506 can determine that the authorization response message indicates that the interaction was not authorized. The service provider computer 506 can transmit a notification to the digital assistant device 504 notifying the digital assistant device 504 of the non-authorized interaction.

At step 552, after receiving the notification and/or the authorization response message that indicates that the interaction was not authorized, the digital assistant device 504 can alert the user to the outcome of the interaction. For example, the digital assistant device 504 can play a message stating that the interaction failed, for example, by stating "the interaction failed." In some embodiments, the digital assistant device 504 can indicate a reason why the interaction failed, for example, "account error," "connection error," "lack of funds," and/or any other suitable reason as determined from the authorization response message. In other embodiments, the digital assistant device 504 can indicate that the user's credentials were invalid. In some embodiments, the digital assistant device 504 can emit an sound that can indicate the user that the interaction was not authorized.

In some embodiments, at step 554, after determining that the interaction was authorized, at step 548, the intermediary computer 508 can successfully complete the interaction. For example, if the interaction is a data transfer between the user device and receiving device, the intermediary computer 508 can facilitate the data transfer.

At step 556, the intermediary computer 508 can forward the authorization response message to the service provider computer 506. In some embodiments, after receiving the authorization response message, the service provider computer 506 can forward the authorization response message to the digital assistant device 504. In other embodiment, the service provider computer 506 can determine that the authorization response message indicates that the interaction was authorized. The service provider computer 506 can transmit a notification to the digital assistant device 504 notifying the digital assistant device 504 of the authorized interaction.

At step 558, after receiving the notification and/or the authorization response message that indicates that the interaction was authorized, the digital assistant device 504 can alert the user to the outcome of the interaction. For example, the digital assistant device 504 can play a message stating that the interaction was authorized, for example, by stating "the interaction was authorized." In other embodiments, the digital assistant device 504 can indicate that the user's credentials were valid. In some embodiments, the digital assistant device 504 can emit an sound that can indicate to the user that the interaction was authorized, thus completing the interaction.

As an example, the digital assistant device 504 may be located in a fitting room in a department store. The user may be a customer that speaks a command to the digital assistant device 504 to purchase an item while in the fitting room such as "purchase W with wallet XYZ." The digital assistant device 504 can record the command (i.e., biometric sample) with a microphone or other suitable biometric reader. The digital assistant device 504 can then convert the biometric sample into a biometric template as described herein. The digital assistant device 504 can then scan for proximate devices. In this case, the proximate devices can be user devices that are located in the fitting room. The digital assistant can create a list of the discovered proximate devices and transmit the list of the discovered proximate devices along with the biometric template (preferably encrypted) to a service provider computer 506.

Upon receiving the list of proximate devices and the biometric template, the service provider computer 506 can query a database for registered users associated with any of the user device identifiers included in the list of proximate devices. The service provider computer 506 can then determine whether or not the received biometric template matches a stored biometric template associated with the user devices identifiers included in the list of proximate devices. In this way, the service provider computer 506 can determine a stored biometric template that matches the received biometric template as well as is associated with a user device identifier that is associated with a user device currently in proximity to the user in the fitting room. The service provider computer 506 can also evaluate the received biometric template to determine user intent, such as purchase an item.

After matching the user device identifier and biometric template as well as determining which function to perform based on the user's command, the service provider computer 506 can transmit a request for a cryptogram to the user device 502 via the digital assistant device 504. At this point the process may end if the user has left the proximity of the digital assistant device 504. For example, the user may leave the fitting room before the user device 502 receives the request for the cryptogram. In this case, the user device 502 may not receive the cryptogram request and the process can be terminated.

The user device 502, upon receiving the request for the cryptogram, can transmit the cryptogram to the digital assistant device 504, which may transmit the cryptogram to the service provider computer 506. The service provider computer 506 can verify that the received cryptogram matches a previously provisioned cryptogram. If the cryptograms match, then the service provider computer 506 can further process the transaction for the products and/or services previously indicated by the user.

As another example, in reference to FIG. 1, a user device 102 can be operated by a user. In some embodiments, the user may be located at a resource provider location and may attempt to pay for a good and/or service at the resource provider. The user may ask a digital assistant device 104 to pay for an item with a certain digital wallet and/or card. The digital assistant device 104 can communicate with a service provider computer 106 as described herein.

After verifying a cryptogram received from the user device 102 (e.g., at step 540), the service provider computer 106 can indicate, via a message, to an intermediary computer 108 to generate an authorization request message for the interaction. In other embodiments, the service provider computer 106 may generate the authorization request message and may transmit the authorization request message to a resource provider computer 110 and/or the transport computer 112.

The resource provider computer 110 may then receive the authorization request message from the service provider computer 106 or the intermediary computer 108. In some embodiments, the resource provider computer 110 can examine the transaction information in the authorization request message for accuracy. If necessary, the resource provider computer 110 can edit the transaction information to reflect a correct amount, product data, etc. For example, the service provider computer 106 may have determined a product that the user wants to purchase based on the biometric template. The service provider computer 106 can include the name of the product as supplied by the user into the transaction information. The resource provider computer 110 can be configured to edit and/or add accurate product data to the authorization request message. For example, the resource provider computer 110 can add the amount of the product to the authorization request message.

The resource provider computer 110 may then transmit the authorization request message to the transport computer 112. The transport computer 112 may then receive, process, and forward the authorization request message to a processing network 114 for authorization.

In general, prior to the occurrence of a credit or debit-card transaction, the processing network 114 has an established protocol with each authorization computer on how the issuer's transactions are to be authorized. The processing network 114 may receive the authorization request message, determine the issuer associated with the user device 102, and forward the authorization request message for the transaction to the authorization computer 116 for verification and authorization. Once the transaction is authorized, the authorization computer 116 may generate an authorization response message (that may include an authorization code indicating the transaction is approved or declined) and transmit this electronic message via its external communication interface to the processing network 114. The processing network 114 may then forward the authorization response message to the transport computer 112, which in turn may then transmit the electronic message (e.g., the authorization response message) comprising the authorization indication to the resource provider computer 110, and then, in some embodiments, to the digital assistant device 104.

At the end of the day or at some other suitable time interval, a clearing and settlement process between the resource provider computer 110, the transport computer 112, the processing network 114, and the authorization computer 116 may be performed on the transaction.

Embodiments of the invention have a number of advantages. For example, embodiments of the invention allow for an interaction, such as a transaction, to be performed with a digital assistant device. The digital assistant device can be an anonymous digital assistant device or an assistant with no context. Today, users are inherently logged in to a digital assistant device, however, embodiments of the invention allow for the user to securely perform an interaction with a pubic/anonymous digital assistant device, such as, a digital assistant device at a resource provider location, while preserving security of the interaction.

Embodiments of the invention provide for additional advantages. For example, the user is authenticated in several ways. The user can be authenticated by a user device identifier matching a stored device identifier while in range of the digital assistant. The user can also be authenticated by their biometric template matching a stored biometric template. Further, the user can be authenticated by the service provider computer by matching a cryptogram received from the user device to a cryptogram previously provisioned to the user device. The user can be authenticated in multiple ways while initiating the interaction.

Embodiments of the invention provide for additional advantages. For example, embodiments can prevent replay attacks, where a malicious party attempts to record the user's voice command to use for later malicious interaction attempts. Embodiments of the invention prevent replay attacks through the use of the user device being in short range communication (e.g., Bluetooth range, etc.) with the digital assistant device. The use of the user device in short range communication ensures that the user is actually present at and/or neat the digital assistant device, and also concurrently ensures that the user has the correct credentials and is in possession of the authentic user device.

For example, a malicious party can record the user's voice command to the digital assistant at a resource provider location. The user can be correctly authentication by the voice command and the cryptogram, as described herein. The malicious party can attempt to either play the malicious recording of the user's voice while the user is present or after the user leaves. In the case that the malicious party plays the malicious recording when the user is present, then the user will be able to hear the malicious recording and report the malicious activity accordingly. In the second case, if the malicious party attempts to play the malicious recording of the user's voice command to the digital assistant device after the user leaves, the service provider computer will not be able to authenticate a cryptogram from the user device, since the user has left the location, and thus communication range. The attempted malicious interaction will be denied as no cryptogram can be verified when the user device is not in short range communication with the digital assistant device, thus preventing replay attacks.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a digital assistant device, a biometric sample from a user, the biometric sample being a biometric voice template associated with a voice command;
   converting, by the digital assistant device, the biometric sample to a biometric template;
   determining, by the digital assistant device, a task flow and parameters associated with the task flow based at least in part on a speech recognition algorithm that utilizes the biometric sample from the user, the task flow designed to accomplish an inferred intent from the biometric sample and executed by invoking programs, services, and application program interfaces (APIs) that corresponds to the inferred intent;
   scanning, by the digital assistant device, for user devices in communication range of the digital assistant device, thereby receiving user device identifiers, wherein scanning for the user devices includes scanning for the user devices that are within the communication range of a Bluetooth low energy component of the digital assistant device and that the user devices include a digital wallet application;
   transmitting, by the digital assistant device to a server computer, a list of the user devices in communication range of the digital assistant device and the user device identifiers of the user devices in communication range of the digital assistant device, wherein the server computer queries a database for registered users associated with the user device identifiers;
   transmitting, by the digital assistant device to the server computer, an authentication request comprising the biometric template and at least one user device identifier of the user device identifiers that are included in the database for the registered users associated with the user device identifiers, the authentication request corresponding to the determined task flow;
   receiving, by the digital assistant device from the server computer, a cryptogram request message comprising the at least one user device identifier;
   transmitting, by the digital assistant device to a user device corresponding to the at least one user device identifier, the cryptogram request message;
   receiving, by the digital assistant device from the user device, a cryptogram, the cryptogram previously generated by the server computer and transmitted to the user device, the cryptogram generated based on user device information of the user device; and transmitting, by the digital assistant device to the server computer, the cryptogram, wherein the server computer verifies the cryptogram before further processing of a transaction.

2. The method of claim 1, wherein the biometric template is an encrypted biometric template.

3. The method of claim 1, wherein after converting the biometric sample to the biometric template, the method further comprises:

determining, by the digital assistant device, the server computer based on the biometric template.

4. The method of claim 1, wherein the server computer is a service provider computer and the server computer:

receives the biometric template and the at least one user device identifier;

determines whether or not the at least one user device identifier matches a stored user device identifier;

determines whether or not the biometric template matches a stored biometric template associated with the stored user device identifier if the at least one user device identifier matches the stored user device identifier; and transmits the cryptogram request message to the digital assistant device.

5. The method of claim 1 further comprising:

notifying, by the digital assistant device, the user about the transaction.

6. A digital assistant device comprising:

a processor;

a memory device; and a computer-readable medium coupled to the processor, the computer-readable medium comprising code executable by the processor for implementing a method comprising:

receiving a biometric sample from a user, the biometric sample being a biometric voice template associated with a voice command;

converting the biometric sample to a biometric template;

determining a task flow and parameters associated with the task flow based at least in part on a speech recognition algorithm that utilizes the biometric sample from the user, the task flow designed to accomplish an inferred intent from the biometric sample and executed by invoking programs, services, and application program interfaces (APIs) that corresponds to the inferred intent;

scanning for user devices in communication range of the digital assistant device, thereby receiving user device identifiers, wherein scanning for the user devices includes scanning for the user devices that are within the communication range of a Bluetooth low energy component of the digital assistant device and that the user devices include a digital wallet application;

transmitting, to a server computer, a list of the user devices in communication range of the digital assistant device and the user device identifiers of the user devices in communication range of the digital assistant device, wherein the server computer queries a database for registered users associated with the user device identifiers;

transmitting, to the server computer, an authentication request comprising the biometric template and at least one user device identifier of the user device identifiers that are included in the database for the registered users associated with the user device identifiers, the authentication request corresponding to the determined task flow;

receiving, from the server computer, a cryptogram request message comprising the at least one user device identifier;

transmitting, to a user device corresponding to the at least one user device identifier, the cryptogram request message;

receiving, from the user device, a cryptogram, the cryptogram previously generated by the server computer and transmitted to the user device, the cryptogram generated based on user device information of the user device; and transmitting, to the server computer, the cryptogram, wherein the server computer verifies the cryptogram before further processing of a transaction.

7. The digital assistant device of claim 6, wherein the biometric template is an encrypted biometric template.

8. The digital assistant device of claim 6, wherein after converting the biometric sample to the biometric template, the method further comprises:

determining the server computer based on the biometric template.

9. The digital assistant device of claim 6, wherein the server computer is a service provider computer and the server computer:

receives the biometric template and the at least one user device identifier;

determines whether or not the at least one user device identifier matches a stored user device identifier;

determines whether or not the biometric template matches a stored biometric template associated with the stored user device identifier if the at least one user device identifier matches the stored user device identifier; and transmits the cryptogram request message to the digital assistant device.

10. The digital assistant device of claim 6, wherein the method further comprises:

notifying the user about the transaction.

11. A method comprising:

receiving, by a server computer from a digital assistant device, an authentication request message comprising a biometric template and at least one user device identifier, the authentication request message corresponding to a task flow, the task flow and parameters associated with the task flow determined, by the digital assistant device, based at least in part on a speech recognition algorithm that uses a biometric sample from a user associated with the digital assistant device, the biometric sample being a biometric voice template associated with a voice command, and the task flow designed to accomplish an inferred intent from the biometric sample and executed by invoking programs, services, and application program interfaces (APIs) that corresponds to the inferred intent, wherein the digital assistant device scans for user devices in communication range of the digital assistant device to receive the user device identifier, and wherein scanning for the user devices includes scanning for the user devices that are within the communication range of a Bluetooth low energy component of the digital assistant device and that the user devices include a digital wallet application;

receiving, by the server computer and from the digital assistant device, a list of the user devices in communication range of the digital assistant device;

querying, by the server computer, a database for registered users associated with the user device identifiers;

comparing, by the server computer, the biometric template to a stored biometric concurrently with determining if the biometric template corresponds to an account associated with the at least one user device identifier of the user device identifiers that are included in the database for the registered users associated with the user device identifiers;

transmitting, by the server computer, a cryptogram request message to the digital assistant device;

receiving, by the server computer, a cryptogram from the digital assistant device, the cryptogram previously generated by the server computer and transmitted to the digital assistant device, the cryptogram generated based on device information of a user device associated with at least one user device identifier of the user device identifiers;

determining, by the server computer, whether or not the cryptogram matches an issued cryptogram previously provisioned to the user device associated with the at least one user device identifier; and if the cryptogram matches the issued cryptogram, then further processing a transaction.

12. The method of claim 11, wherein further processing a transaction further comprises:

transmitting, by the server computer, an authorization request message to an authorization computer; and receiving, by the server computer, an authorization response message.

13. The method of claim 11, wherein the server computer is a service provider computer.

14. The method of claim 11 further comprising:

evaluating, by the server computer, the biometric template to determine whether or not to transmit the cryptogram request message.

* * * * *